(12) United States Patent
Namburu (10) Patent No.: US 9,736,917 B2
(45) Date of Patent: Aug. 15, 2017

(54) ROTATABLE PLASMA CUTTING TORCH ASSEMBLY WITH SHORT CONNECTIONS

(71) Applicant: LINCOLN GLOBAL, INC., City of Industry, CA (US)

(72) Inventor: Praveen K. Namburu, Charleston, SC (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 392 days.

(21) Appl. No.: 14/465,752

(22) Filed: Aug. 21, 2014

(65) Prior Publication Data

US 2016/0057847 A1  Feb. 25, 2016

(51) Int. Cl.
  *H05H 1/28* (2006.01)
  *H05H 1/34* (2006.01)
  *B23K 10/00* (2006.01)
  *B23K 37/02* (2006.01)

(52) U.S. Cl.
  CPC ............... *H05H 1/34* (2013.01); *B23K 10/00* (2013.01); *B23K 37/0241* (2013.01)

(58) Field of Classification Search
  CPC ....... H05H 1/34; B23K 37/0241; B23K 10/10
  USPC ...... 219/74, 121.36, 121.48, 121.49, 121.51, 219/121.52, 121.59
  See application file for complete search history.

(56) References Cited

U.S. PATENT DOCUMENTS

| | | | |
|---|---|---|---|
| 4,967,055 A | 10/1990 | Raney et al. | |
| 5,464,962 A | 11/1995 | Luo et al. | |
| 5,601,734 A | 2/1997 | Luo et al. | |
| 5,695,662 A | 12/1997 | Couch, Jr. et al. | |
| 5,747,767 A | 5/1998 | Severance et al. | |
| 5,756,959 A | 5/1998 | Freeman et al. | |
| 5,767,478 A | 6/1998 | Walters | |
| 5,841,095 A | 11/1998 | Lu et al. | |
| 5,886,315 A | 3/1999 | Lu et al. | |
| 5,934,175 A * | 8/1999 | Vatel | F15B 15/1419 92/252 |
| 5,977,510 A | 11/1999 | Lindsay et al. | |
| 5,994,663 A | 11/1999 | Lu | |
| 6,020,572 A | 2/2000 | Marner et al. | |
| 6,066,827 A | 5/2000 | Nemchinsky | |
| 6,084,199 A | 7/2000 | Lindsay et al. | |
| 6,114,650 A | 9/2000 | Marner et al. | |
| 6,130,399 A | 10/2000 | Lu et al. | |

(Continued)

FOREIGN PATENT DOCUMENTS

DE  102004049445 A1  4/2006
DE  202006018163 U1 *  3/2007

(Continued)

OTHER PUBLICATIONS

International Application No. PCT/IB2015/001412, International Search Report & Written Opinion, 12 pages, Feb. 9, 2016.

(Continued)

*Primary Examiner* — Thien S Tran
(74) *Attorney, Agent, or Firm* — Perkins Coie, LLP.

(57) ABSTRACT

A rotatable plasma torch is provided which can easily rotate when used in robotic or automatic cutting system while minimizing damage to internal connections of the torch. The torch is provided with a sleeve structure on the torch handle where there is no structure or component positioned between the sleeve and the exterior of the torch handle.

8 Claims, 5 Drawing Sheets

(56) References Cited

U.S. PATENT DOCUMENTS

| | | |
|---|---|---|
| 6,207,923 B1 | 3/2001 | Lindsay et al. |
| 6,403,915 B1 | 6/2002 | Cook et al. |
| 6,423,922 B1 | 7/2002 | Nemchinsky et al. |
| 6,424,082 B1 | 7/2002 | Hackett et al. |
| 6,452,130 B1 | 9/2002 | Qian et al. |
| 6,483,070 B1 | 11/2002 | Diehl et al. |
| 6,614,001 B2 | 9/2003 | Hackett et al. |
| 6,686,559 B1 | 2/2004 | Walters et al. |
| 6,841,754 B2 | 1/2005 | Cook et al. |
| 6,946,617 B2 | 9/2005 | Brandt et al. |
| 6,969,819 B1 | 11/2005 | Griffin et al. |
| 7,019,255 B2 | 3/2006 | Brandt et al. |
| 7,081,597 B2 | 7/2006 | Severance, Jr. et al. |
| 7,193,174 B2 | 3/2007 | Brandt et al. |
| 7,256,366 B2 | 8/2007 | Severance et al. |
| 7,375,302 B2 | 5/2008 | Twarog et al. |
| 7,375,303 B2 | 5/2008 | Twarog et al. |
| 7,423,235 B2 | 9/2008 | Severance, Jr. et al. |
| 7,435,925 B2 | 10/2008 | Griffin et al. |
| 7,598,473 B2 | 10/2009 | Cook et al. |
| 7,605,340 B2 | 10/2009 | Duan et al. |
| 7,659,488 B2 | 2/2010 | Cook et al. |
| 7,754,993 B2 | 7/2010 | Ortega et al. |
| 7,829,816 B2 | 11/2010 | Duan et al. |
| 7,989,727 B2 | 8/2011 | Twarog et al. |
| 8,035,055 B2 | 10/2011 | Twarog et al. |
| 8,089,025 B2 | 1/2012 | Sanders et al. |
| 8,097,828 B2 | 1/2012 | Roberts et al. |
| 8,101,882 B2 | 1/2012 | Mather et al. |
| D654,104 S | 2/2012 | Fitzpatrick et al. |
| 8,115,136 B2 | 2/2012 | Mather et al. |
| 8,153,927 B2 | 4/2012 | Twarog et al. |
| 8,212,173 B2 | 7/2012 | Liebold et al. |
| 8,304,684 B2 | 11/2012 | Smith et al. |
| 8,338,740 B2 | 12/2012 | Liebold et al. |
| 8,389,887 B2 | 3/2013 | Currier et al. |
| 8,395,077 B2 | 3/2013 | Duan et al. |
| 8,525,069 B1 | 9/2013 | Mather et al. |
| 8,541,712 B2 | 9/2013 | Mather et al. |
| D692,402 S | 10/2013 | Dalton et al. |
| 8,546,718 B2 | 10/2013 | Mather et al. |
| 8,546,719 B2 | 10/2013 | Warren, Jr. et al. |
| 8,581,139 B2 | 11/2013 | Severance, Jr. |
| 8,633,417 B2 | 1/2014 | Ashtekar et al. |
| 8,698,036 B1 | 4/2014 | Kornprobst et al. |
| 8,759,709 B2 | 6/2014 | Mather et al. |
| 8,772,667 B2 | 7/2014 | Yang et al. |
| 8,829,385 B2 | 9/2014 | Yang et al. |
| 2002/0185475 A1 | 12/2002 | Horner-Richardson et al. |
| 2004/0169018 A1 | 9/2004 | Brasseur et al. |
| 2006/0163216 A1 | 7/2006 | Brandt et al. |
| 2012/0012560 A1 | 1/2012 | Roberts et al. |
| 2013/0043224 A1 | 2/2013 | Leiteritz et al. |
| 2013/0306607 A1 | 11/2013 | Mather et al. |
| 2014/0021175 A1 | 1/2014 | Chen et al. |
| 2014/0110382 A1 | 4/2014 | Beliveau et al. |

FOREIGN PATENT DOCUMENTS

| | | |
|---|---|---|
| EP | 0729805 A1 | 4/1996 |
| EP | 0790756 A2 | 8/1997 |
| WO | 9953734 A1 | 10/1999 |
| WO | 200028794 A1 | 5/2000 |
| WO | 2006113737 A2 | 10/2006 |
| WO | 2008101226 A1 | 2/2008 |
| WO | 2010111695 A1 | 9/2010 |
| WO | 2012118826 A1 | 9/2012 |
| WO | 2014187438 A1 | 11/2014 |

OTHER PUBLICATIONS

International Application No. PCT/IB2015/000683 International Search Report & Written Opinion, 12 pages, Aug. 31, 2015.
International Application No. PCT/162015/000702, International Search Report & Written Opinion, 14 pages, Aug. 25, 2015.
International Application No. PCT/162015/000714, International Search Report & Written Opinion, 10 pages, Aug. 31, 2015.
International Application No. PCT/162015/001694, International Search Report & Written Opinion, 14 pages, Dec. 23, 2015.
International Preliminary Report on Patentability issued in related patent application PCT/IB2015/001412 on Mar. 2, 2017—10 pages.

* cited by examiner

ROTATABLE PLASMA CUTTING TORCH ASSEMBLY WITH SHORT CONNECTIONS

BACKGROUND OF THE INVENTION

Field of the Invention

Systems and methods of the present invention relate to plasma cutting, and more specifically to arc plasma cutting using a torch assembly that can be mounted in robotic arm systems.

Description of the Related Art

The use of plasma cutting systems in various industries has grown, including the use of plasma cutting systems with robotic systems. In such applications, the plasma cutting torch is secured to a robotic arm or motion mechanism which moves the torch in many different directions. In fact, in many robotic applications the robot has many different axis of movement. This complex movement often requires the torch to move relative to the robot arm which imparts a rotational movement. Because of the electrical and cooling liquid connections on the torch this rotational movement must be limited so as to not break these connections. Further, after a certain amount of movement the operation must be stopped so as to allow the robotic arm to unwind—which releases any torque from the torch connections. Therefore, the more complex the movement and control of the torch the more often the operation will have to be stopped to unwind the torch. This increases downtime of the cutting operation and can lead to premature failure of the torch connections through constant loading and unloading of torsional stresses. Therefore, torch construction is needed to mitigate these issues.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

Embodiments of the present invention include equipment and methods for using a plasma cutting system which employs a rotatable plasma torch which can easily rotate when used in robotic or automatic cutting system while minimizing damage to internal connections of the torch. The torch is provided with a sleeve structure on the torch handle where there is no structure or component positioned between the sleeve and the exterior of the torch handle.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1:
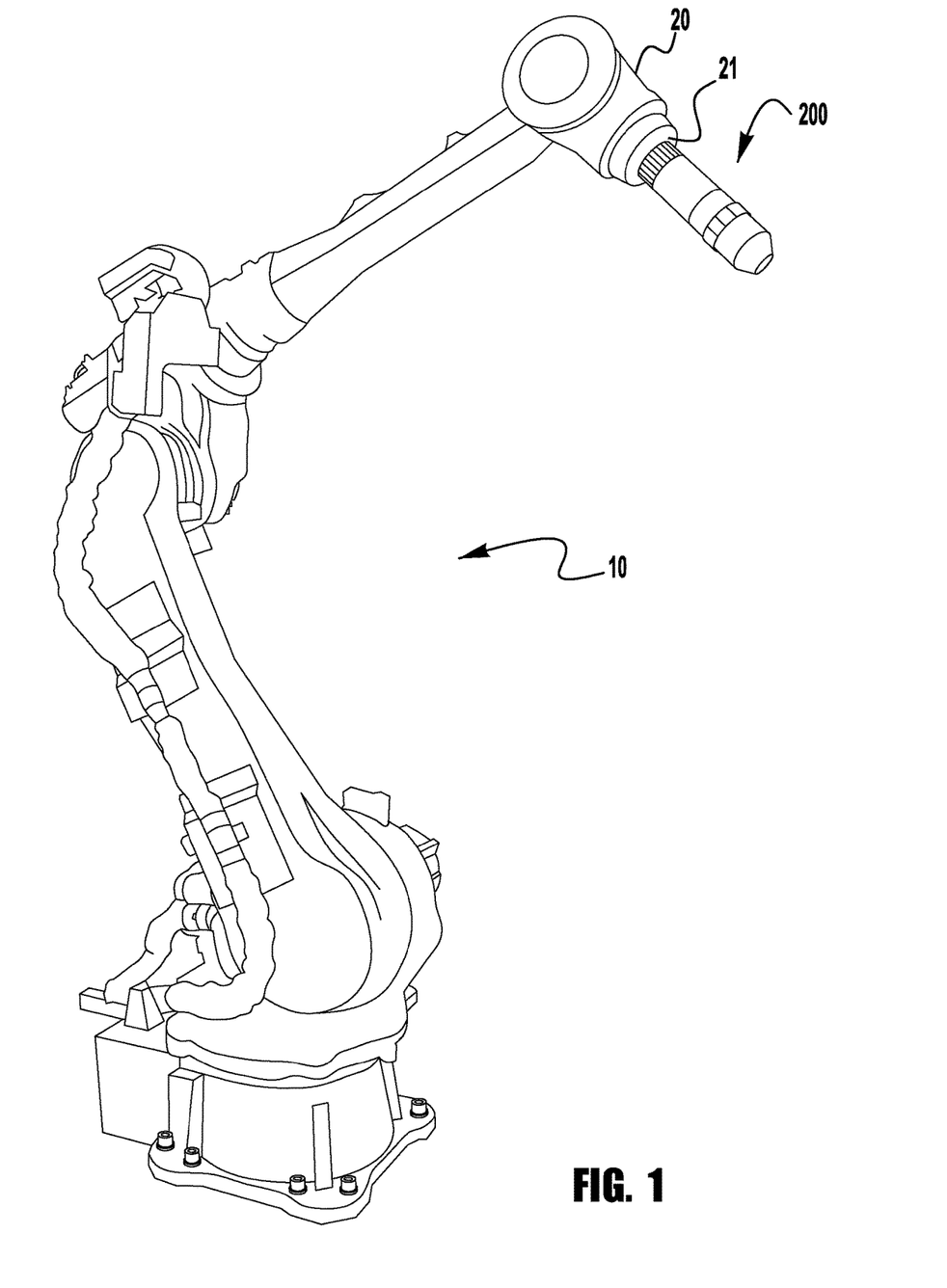
FIG. 1 is a diagrammatical representation of an exemplary system using an exemplary torch of the present invention.

FIG. 1 depicts an exemplary robotic system 10 using a torch 200 in accordance with an exemplary embodiment of the present invention. It is noted that for purposes of the following discussion, the system will be discussed as a plasma arc cutting system. However, exemplary embodiments are not limited to being used in arc cutting systems. Embodiments of the present invention can be used with many systems which require complex movement of a torch like assembly, in which rotational movement and forces are imparted. For example, embodiments of the present invention can be used with arc welding, electroslag welding, cladding, joining, hot wire and additive manufacturing systems without departing from the spirit or scope of the present invention. Arc welding systems can be of the GMAW, GTAW, SAW, FCAW type, as an example. Further, exemplary embodiments of the present invention can be used in automatic, robotic, semi-automatic and manual systems. As indicated above, the exemplary embodiments discussed herein will use an arc cutting system as exemplary but this is in no way intended to be limiting.

As shown in FIG. 1, the torch 200 is coupled to a robotic arm assembly 10. The robotic arm assembly 10 can be constructed and operated in accordance with known robotic cutting and welding systems and is not intended to be limiting in any way. As is generally understood, the movement and operation of the arm 10 can be controlled by a computer control system (not shown) and can also be coupled to a power supply (also not shown) which provides the current used to create the plasma arc in the torch 200 for the cutting operation. The general construction and operation of such systems is known and need not be described herein. The robotic arm typically has a tool connection end 20 to which the torch 200 is coupled for the cutting operation. The tool connection end 20 has a tool connection structure 21 which couples to the torch 200 and holds the torch 200 in the tool connection end. The connection structure 21 can be configured in a number of different ways. In many applications the tool connection structure 21 has an interior surface which couples to an outer surface of the torch 200 to hold the torch in place. Of the connection structure 21 can use any number of different connection methodologies to hold the torch 200 in place including fasteners, clamping structure, etc. Embodiments of the present invention are not limited in this regard.

Figure 2:
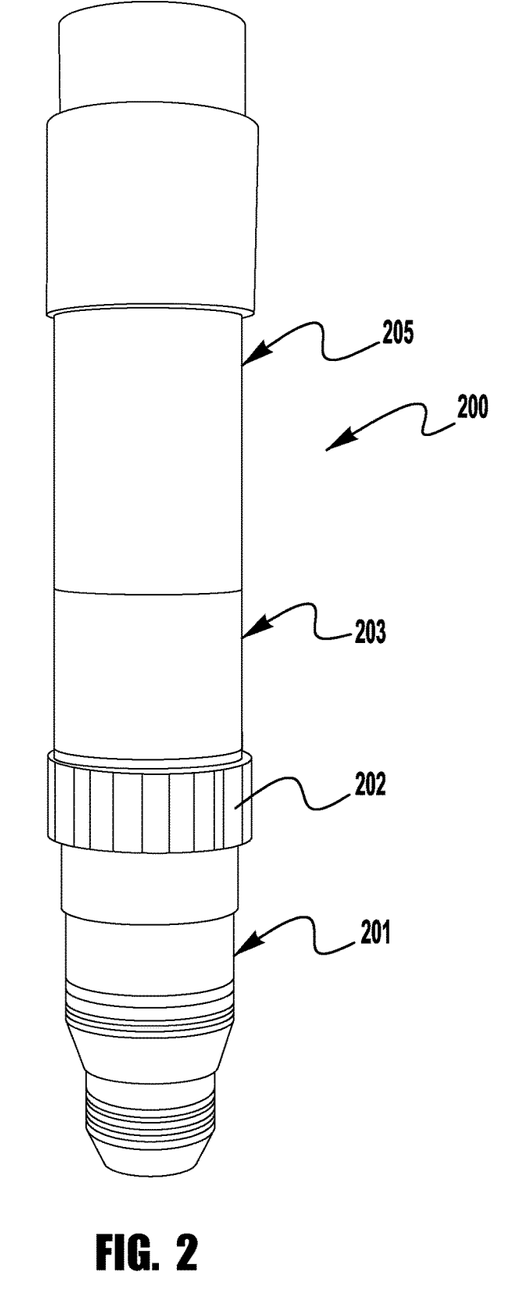
FIG. 2 is a diagrammatical representation of an exemplary torch of the present invention.
Figure 3:
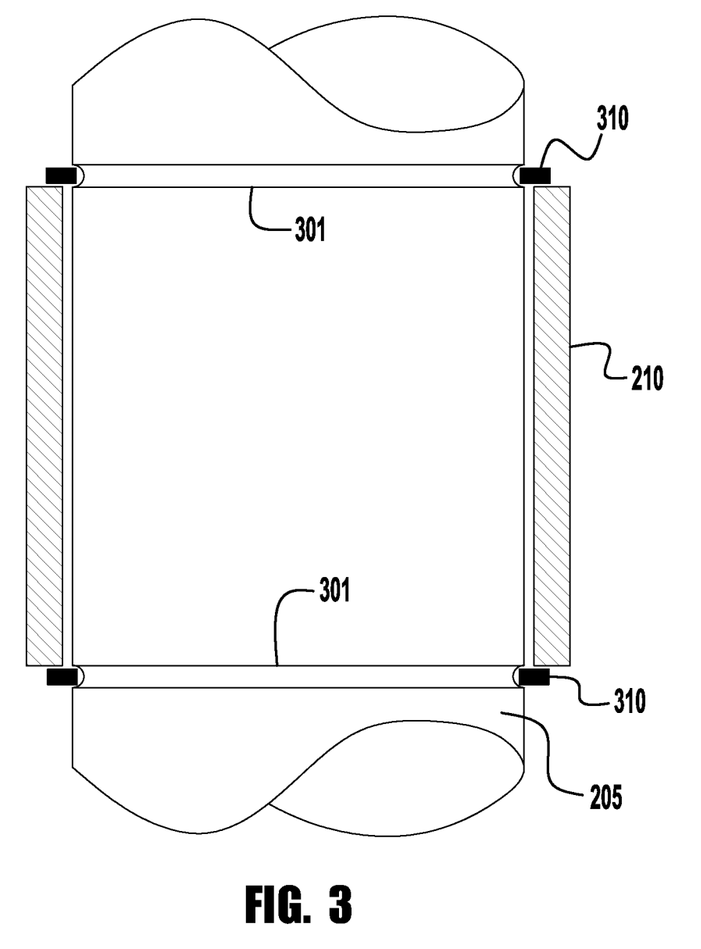
FIG. 3 is a diagrammatical representation of a cross-section of a portion of an exemplary torch of the present invention.

FIG. 2 depicts an exemplary torch assembly 200 of the present invention. In many respects the torch assembly 200 is constructed and operated similar to known plasma torch constructions, except for the differences described in detail herein. Therefore, many known aspects of the torch construction and operation are not discussed in detail herein. As shown, exemplary embodiments of the present invention have a torch head portion 201. The torch head portion 201 represents the distal end of the torch 200 from which the plasma is propelled for the cutting operation. In FIG. 2 a shielding is not shown in the distal end, but often a shield is placed over the distal end of the torch head 201. The torch head 201 is coupled to a torch body 203. In the exemplary embodiment shown the threaded connection collar 202 couples the torch head 201 to the torch body 203. The torch body 203 typically has a number of electrical contacts and connections which couple the electrical current and cooling liquids and/or shielding gas from the upstream sources to the torch head. Coupled to the torch body 203 is the torch handle 205. The torch handle 205 is typically threaded onto the torch body 203 and is used to secure the torch 200 to the robotic system or the connection portion 21. Because of this if the torch needs to be service or replaced the torch head 201 and torch body 203 can be easily removed from the torch handle 205 without removing the torch handle 205 from its connection. As shown in FIGS. 2 and 3, the torch handle has an outer casing, which is typically metallic and protects the components internal to the torch handle 205.

As shown in the exemplary embodiment, the torch 200 also includes a rotating collar 210 which is free to rotate 360 degrees relative to the surface of the torch handle 205. When mounted to the robot or other motion control device, the outer surface of the rotating collar 210 is coupled to the connection structure 21. For example, in the embodiment shown the connection structure can be a clamping mechanism that clamps onto the outer surface of the collar 210 so as to secure the torch 200 to the robot (or gantry, etc.). The collar is a cylindrical structure with an inner diameter that is slightly larger than the outer diameter of the torch handle 205 such that the collar 210 is free to fully rotate relative to the handle 205. Thus, as the robot, gantry or whatever motion control structure is moved and rotated the torch 200 remains relatively stationary (from a rotational standpoint). Because of this, the robot does not have to be moved to "unwind" the torch and little or no torque forces are applied to the torch connections (not shown in FIG. 2). Further, as explained more fully below, the collar 210 is secured to the torch handle 205 in a longitudinal direction such that the torch 200 does not slide in and out of the collar 210—which would affect the cutting accuracy of the torch 200. This is explained more fully below.

FIG. 3 depicts a close up view of the collar 210 and the torch handle 205 where the collar 210 is shown in cross-section. As described above the collar 210 is sized such that it's inside diameter is slightly larger than the outside diameter of the outer casing of the torch handle 205. However, the gap between the collar 210 and the torch handle 205 should not be too large such that the torch 200 is not supported in a stable manner. In exemplary embodiments of the present invention, the gap between the inner surface of the collar 210 and the outer surface of the torch handle 205 is in the range of 0.0005 and 0.002 inches. The gap may be larger in some applications, however, the gap should not be so large such that the accuracy of the cutting operation is compromised. The outer surface of the outer casing of the torch handle has two grooves 301 in its outer surface, where the grooves 301 are positioned at each of the respective distal ends of the collar 210. In the embodiment shown, the grooves 301 go around the entire diameter of the torch handle 205, but in other exemplary embodiments, the grooves 301 need no go around the entire diameter. In each of the grooves 301 a lock ring 310 is placed where the inner diameter of the lock rings 310 sit inside the respective grooves 301 while an outer diameter of each of the lock rings 310 protrudes beyond the outer surface of the torch handle 205. Thus, once positioned in each of their respective grooves 301 the lock rings 310 hold the collar 210 in position longitudinally along the length of the torch handle 205. With this construction there is no structure or component positioned between the inner surface of the collar 210 and the outer surface of the handle 205. That is there is no structure or component between the entirety of the inner surface of the collar 210 and the outer surface of the handle 205. This provides a significant advantage over more complex rotational connections which have numerous rotational elements or do not easily connect with known robotic connections. These elements can wear or otherwise be compromised—particularly in environments normally associated with cutting and metal fabrication. Thus, embodiments of the present invention provide a highly reliable rotational connection which greatly improves the usage and life of a torch 200.

The lock rings 310 can be constructed similar to split washers where the rings are nearly circular but have a gap between two ends of the ring, such that the gap allows the rings 310 to be placed into the grooves 301. The grooves 301 should be of a depth and shape so as to allow for the sufficient seating of the rings so that the rings 310 can hold the collar 210, and thus the torch 200 in a longitudinally fixed position relative to each other. Each of the collar 210 and the rings 310 can be made of materials such as brass, stainless steel, etc., so long as they have sufficient strength to support the torch 200 during operation.

It is noted that in the embodiment shown in FIG. 3 a single pair of grooves are shown in the outer casing of the torch handle 205. However, in other exemplary embodiments the torch handle 205 can a plurality of pairs of grooves 301 in the outer casing of the torch handle 205. Each respective pair of grooves 301 would be separated by the needed distance to accommodate the collar 210 as shown in FIG. 3. However, each pair can be displaced from each other by a predetermined increment (for example, 0.5 inch, 1 inch, etc.). Such an embodiment would provide a user with flexibility when mounting the torch assembly 200 to a specific robot or for a specific operation. That is, the user could then adjust the amount the torch assembly protrudes from a robot mount, or the like, by adjusting which pair of grooves 301 in the torch handle is used. This is accomplished by changing the position of the collar 210 along the length of the torch handle 205 casing, using of the pairs of grooves 301 as desired. The user could remove the rings 310 and slide the collar 210 to the desired pair of grooves and then install the rings 310 at the corresponding grooves 301. This will provide additional flexibility to the use of the torch 200. Such a configuration can also allow for the use of collars of different lengths depending on a desired application.

Additionally, in further exemplary embodiments at least one protrusion from the surface of the torch handle 205 casing could be used to restrain the collar 210. For example, at the upstream end of the collar 210 a protrusion could extend radially out from the surface of the torch handle 205 to engage with the upstream end of the collar 210 and a groove and ring restraining configuration can be used at the downstream end of the collar 210, to allow for the removal and replacement of the collar 210.

Figure 4:
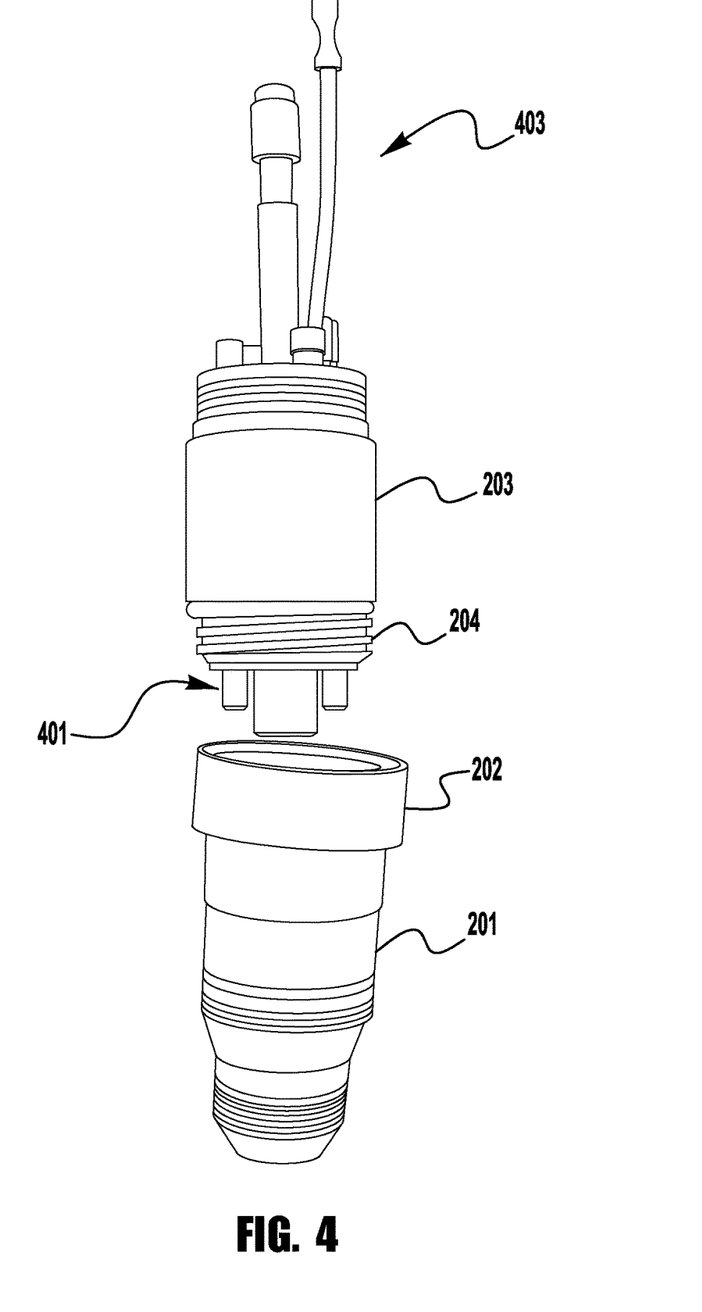
FIG. 4 is a diagrammatical representation of an exemplary torch that has been disassembled.

FIG. 4 depicts components of an exemplary torch 200 as described herein. As explained previously, the torch 200 is made up of a number of main components. As shown in FIG. 4, the torch head 201 has a threaded collar 202 which secures the torch head to a threaded portion 204 of the torch body 203. The torch body 203 also has a plurality of torch connections 401 which align with corresponding connections within the torch head 201. These connections 401 allow for the transfer of cutting/shielding gas, torch coolant and electrical current from the torch body 203 to the torch head 201. Also, some of these connections 401 can be used to align the head 201 and the body 203 such that their connection has the proper alignment. Further, the torch body 203 also has a plurality of upstream connections 403 which serve a similar purpose to the torch connections 401 discussed above. However, these connections couple the torch body to connections within the torch handle 205. Because of the high currents experienced during cutting and plasma arc initiation, in known torch constructions these connections are quite long. That is, these connections 403 are long to prevent sparks or arcing between internal components of the torch during high voltage pulses. However, because these connections are long they are prone to damage from torsional movement of the torch 200 during operation. As further explained below, embodiments of the present invention obviate these concerns and are capable of using much shorter connection lengths which are less prone to wear and damage. This is explained further, with respect to FIG. 5.

Figure 5:
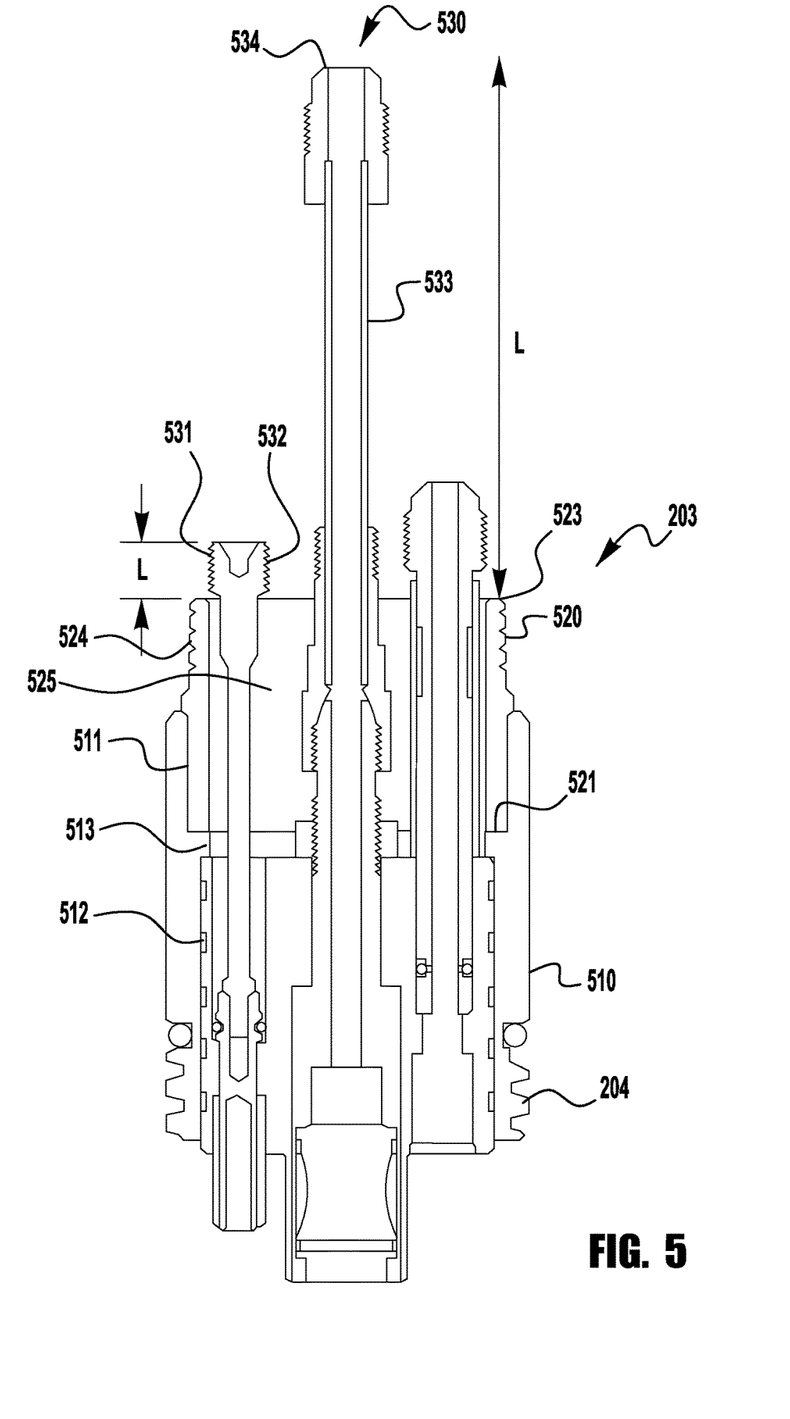
FIG. 5 is a diagrammatical representation of a cross-section of an exemplary torch base of the present invention.

FIG. 5 is a cross-sectional view of an exemplary torch body 203 of the present invention. Unlike known torches, the torch body 203 is made up of two torch components, a primary torch body portion 510 and a dielectric torch body portion 520. The primary torch portion 510 is metallic using known materials used for torch body construction, while the dielectric torch body portion 520 is made from a non-conductive dielectric material, such as a plastic resin, or the like. Ideally, the dielectric portion 520 is made from a non-conductive material that is resistant to high levels of heat, due to the cutting environment. The dielectric portion 520 is inserted into a cavity portion 511 of the primary torch body portion 510. The dielectric portion can be either press fit or threaded into the cavity 511. Of course other methods can be used so long as the dielectric portion 520 is sufficiently secured into the cavity 511. Further the primary portion 510 also has a separator portion 513 which separates the cavity 511 from the downstream cavity 512. The separator portion 513 has a plurality of opening in it to allow the electrical, coolant and shielding connections and tubes to pass through the separator 513 as shown. In exemplary embodiments, a distal end 521 of the dielectric portion 520 abuts against the separator 513 when the portion 520 is inserted into the cavity 511. The dielectric portion 520 has an upstream end portion 523 which has a threaded portion 524, where the threaded portion 524 threads into the downstream end of the torch handle 205.

As shown in FIG. 5, in exemplary embodiments the dielectric portion 520 has an upstream end 523 which extends beyond the most upstream end of the primary portion 510, which provides additional insulative benefits. Further, as shown, the dielectric portion 420 has a length which contacts the separator 513 such that the dielectric portion 520 covers the entirety of the inner surface of the walls of the cavity 511.

In some exemplary embodiments of the present invention, the dielectric portion 520 has a cavity 525 which extends through the length of the portion 520 and this cavity is filled with a dielectric material, such as a potting material. This provides added insulation and stability for the torch body and the conduits 530. Further, the dielectric portion 520 has an overall length which is in the range of 35 to 75% of the overall length of the torch body 203, as measured from the distal end of the primary portion 510 to the upstream end of the dielectric portion 520.

The torch body 203 also has a plurality of conduits 530 which are used to pass electric current, coolant and/or shielding gas through the torch body 203 to the torch head 201 to facilitate a cutting operation. A primary conduit 531 extends the furthest from the upstream end 523 and can be used to deliver electrical current and coolant through the torch body 203.

In known torch constructions, which are used for high amperage applications, the high voltage pulse lead 531 is quite long. For example, in known torches the high voltage pulse lead 531 has a length L (measured from the upstream end 523) of at least 1.5 inches. This length is needed in known torches to provide a sufficient distance between the connection portion 532 of the high voltage pulse lead 531 and the end 523 on the torch body housing. As explained previously, known torch body housings are metallic. Because of this, if the length L was too short, during high voltage electrical pulses (for example during arc initiation) an arc can jump from the connector 532 to the end of the torch body housing. This arc jump can cause significant damage to the torch components. Thus, known torches must have a longer length L to prevent arc jumping events. However, as explained above these longer lengths are prone to bending and torsional damage.

Unlike known torches, because embodiments of the present invention employ the construction described above the length L can be considerably shorter, meaning that the conduits are less susceptible to torsional and bending damage. For example, in embodiments of the present invention, the length L of the high voltage pulse lead 531 is in the range of 0.25 to 0.075 inches in length. This significantly improves the durability of the lead 531. This is particularly true in torches whose operational/cutting current levels are 100 amps and higher. Embodiments of the present invention are particularly advantageous in torches and torch systems which are operating at 100 amps or higher as arc initiation is through the use of high voltage pulses. As explained this typically requires longer leads, and as such advantages from embodiments of the present invention can be achieved.

Further, much like the high voltage pulse lead 531, the coolant conduit 533 can also be significantly reduced in length, as compared to known torches. In exemplary embodiments of the present invention, the coolant conduit 533 can have a length L in the range of 2 to 6.5 inches, as measured from the end 523 to the tip of the connector 534—which connects the conduit 533 to the coolant supply connection within the torch handle 205. In other exemplary embodiments, the length L is in the range of 2 to 4 inches.

Additionally, because of the advantages of the discussed embodiments, the torch handle 205 can also be significantly reduced in length, greatly reducing the overall length of the torch assembly 200.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:
1. A cutting torch assembly, comprising:
   a torch body having a distal end and an upstream end;
   a torch head coupled to said distal end of said torch body;
   a torch handle coupled to said upstream end of said torch body, said torch handle having an outer casing; and
   a rotatable collar secured to said outer casing of said torch handle,
   wherein said outer casing has a first retaining structure positioned at an upstream end of said rotatable collar, and a second retaining structure positioned at a downstream end of said rotatable collar, wherein said torch handle can rotate relative to said rotatable collar, wherein no structure is positioned between an inner surface of said rotatable collar and an outer surface of said outer casing of said torch handle, and wherein each of said first and second retaining structures are comprised of a groove in the surface of said outer casing and a ring structure which is partially embedded in said groove such that said rotatable collar is positioned between each of said ring structures.

2. The torch assembly of claim 1, wherein said rotating collar is rotatable 360 degrees relative to said outer casing.

3. The torch assembly of claim 1, wherein a gap between an inner surface of said rotatable collar and said outer casing has a maximum distance in a range of 0.0005 to 0.002 inches.

4. The torch assembly of claim 1, wherein said outer casing has a plurality of pairs of corresponding grooves which are spaced a predetermined distance from each other, where each of said respective pairs of grooves are spaced from each other by a distance to accommodate said rotatable collar and use a retaining structure in each of said grooves to secure said rotatable collar in a fixed position on said outer casing, and wherein each retaining structure is removable to allow for the changing of the position of said rotatable collar along a length of said outer casing.

5. A torch handle assembly for a cutting torch, comprising:

a torch handle body having an outer casing; and a rotatable collar secured to said outer casing of said torch handle body, wherein said outer casing has a first retaining structure positioned at an upstream end of said rotatable collar, and a second retaining structure positioned at a downstream end of said rotatable collar, wherein said torch handle can rotate relative to said rotatable collar, and wherein no structure is positioned between an inner surface of said rotatable collar and an outer surface of said outer casing of said torch handle, and wherein each of said first and second retaining structures are comprised of a groove in the surface of said outer casing and a ring structure which is partially embedded in said groove such that said rotatable collar is positioned between each of said ring structures.

6. The torch assembly of claim 5, wherein said rotating collar is rotatable 360 degrees relative to said outer casing.

7. The torch assembly of claim 5, wherein a gap between an inner surface of said rotatable collar and said outer casing has a maximum distance in a range of 0.0005 to 0.002 inches.

8. The torch assembly of claim 5, wherein said outer casing has a plurality of pairs of corresponding grooves which are spaced a predetermined distance from each other, where each of said respective pairs of grooves are spaced from each other by a distance to accommodate said rotatable collar and use a retaining structure in each of said grooves to secure said rotatable collar in a fixed position on said outer casing, and wherein each retaining structure is removable to allow for the changing of the position of said rotatable collar along a length of said outer casing.

\* \* \* \* \*